Sept. 2, 1952            C. E. GREENE            2,609,524
ELECTRIC CONTROL SYSTEM
Filed March 28, 1947
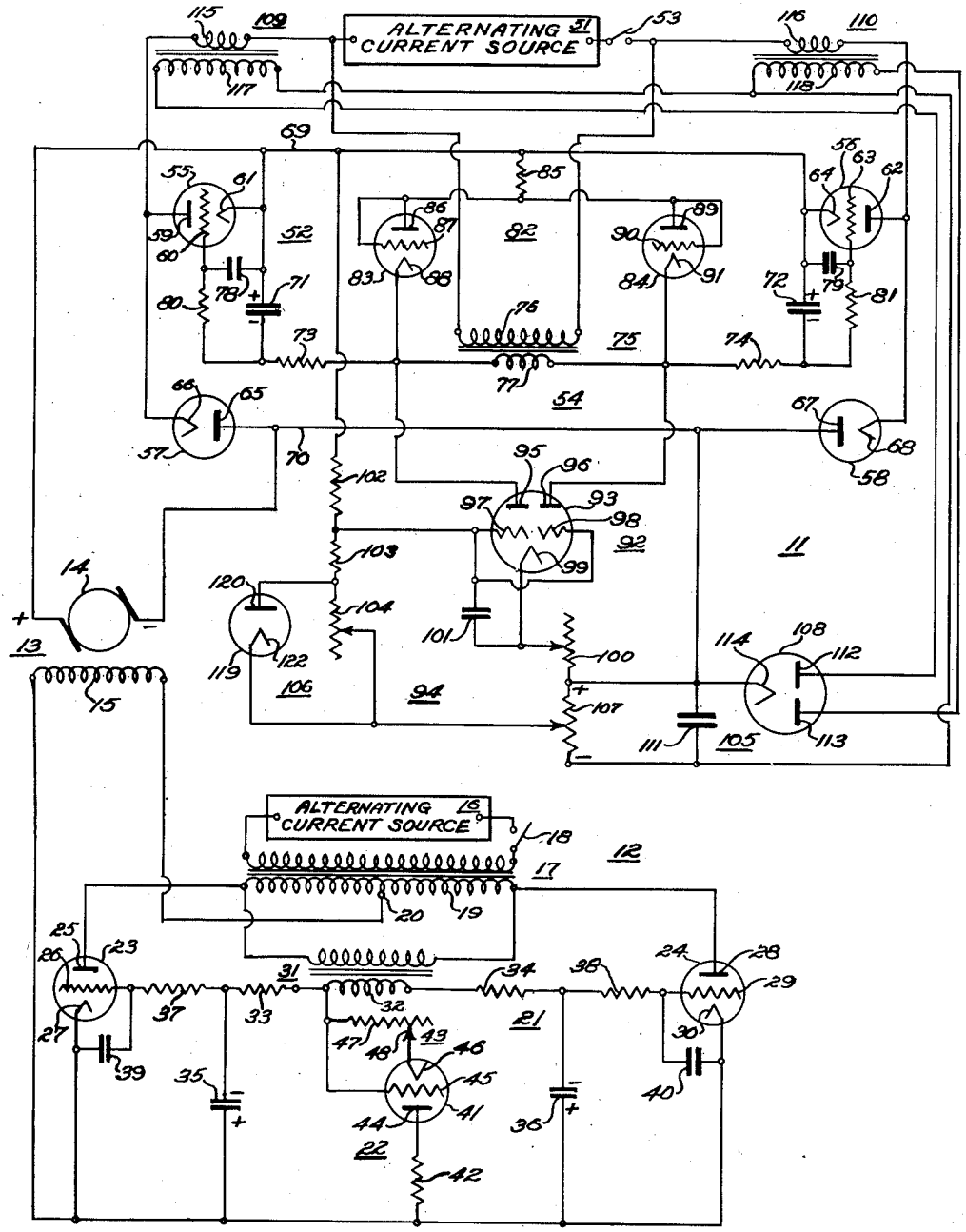
INVENTOR.
Claude E. Greene
BY
Hoodling and Krost
attys Patented Sept. 2, 1952

2,609,524

UNITED STATES PATENT OFFICE 2,609,524

ELECTRIC CONTROL SYSTEM

Claude E. Greene, Sidney, Ohio, assignor to The Monarch Machine Tool Company, a corporation of Ohio Application March 28, 1947, Serial No. 737,931

16 Claims. (Cl. 318—345)

1

My invention pertains generally to electrical control systems, and more particularly to electrical systems for controllable rectifiers that supply rectified energy from an alternating current source to a direct current load.

An object of my invention is the provision of an electrical control system for a controllable rectifier supplying rectified power to a direct current motor wherein the motor is operable over a wide range of load and speed variations.

Another object of my invention is a controllable rectifier supplying rectified power to a direct current motor wherein the motor is operable over a wide range of predetermined speed settings with such predetermined speed remaining substantially constant over wide variations of power requirements.

Another object of my invention is the provision of a controllable rectifier system for a direct current load which is low in cost and small in size, and yet maintains good voltage regulation over wide ranges of voltage and current requirements.

Another object of my invention is the provision of a condenser in the grid circuit of a controllable tube for charging the condenser by grid current flow to produce a direct current bias thereacross with means external of the grid circuit for discharging the condenser at a predeterminable variable rate.

Another object of my invention is the provision of a condenser in the grid circuit of a controllable tube for charging the condenser by grid current flow to produce a direct current bias thereacross with means external of the grid circuit for discharging the condenser and other means external of the grid circuit for charging the condenser at a predeterminable variable rate.

Other objects and a fuller understanding of my invention may be had by referring to the following description and claims, taken in conjunction with the accompanying drawing, in which the single figure is a schematic diagram of the preferred embodiment of my invention as applied to a complete rectifier system supplying rectified power to the armature and field of a direct current motor.

Electronic control systems to control the flow of power from an alternating current system to a direct current system have been in existence for a good number of years, and have been continuously improved upon in the manner of refinements of operation, but as a consequence these improvements and modifications have resulted in a bulky and expensive piece of equipment. The result is that electronic equipment, to control a direct current motor for example, is many times larger than the motor it is controlling, and considerably larger than electromechanical rotating equipment to accomplish the same purpose. The primary purpose of my invention is therefore to reduce the size, and the cost as well, of such electronic equipment so that it is as small or smaller, and considerably cheaper,

2 than comparable rotating equipment. These purposes have been accomplished without sacrifice of, and indeed a substantial improvement is obtained in, the speed range and voltage regulation of such equipment. This superior result has been accomplished principally by the elimination of large expensive items of equipment in the control circuit and the designing of a control circuit that uses small inexpensive items of equipment of low voltage rating and small capacity.

The single figure schematically illustrates a complete motor control system including an armature energizing system 11 and a field energizing system 12. The entire electrical system supplies power to a motor 13, that has an armature 14 energized by the armature energizing system 11, and a field 15 energized by the field energizing system 12. Many features of the armature and field energizing systems 11 and 12 are interchangeable which will be brought forth later, but inasmuch as I have chosen to show the field energizing system 12 as being of simpler circuit design, this field energizing system 12 will be explained first.

The field energizing system 12 includes generally an alternating current source 16, an anode transformer 17, a rectifier system 21, and a variable impedance device 22. The alternating current source 16 energizes the anode transformer 17 through a switch means 18. The anode transformer 17 has a secondary or output winding 19 that has a midtap 20. The rectifier system 21 is energized from the secondary 19, and includes first and second rectifier tubes 23 and 24, in a conventional full-wave rectifier system for supplying rectified energy to the field 15. The first rectifier tube 23 has an anode 25, a control grid 26 and a cathode 27, with the second rectifier tube 24 having like elements designated 28, 29 and 30 respectively. A grid transformer 31 is energized by the alternating current source 16 in an in-phase relationship with the anodes 25 and 28 of the first and second rectifier tubes 23 and 24. The grid transformer 31 has a secondary or output winding 32 for energizing the grids 26 and 29 with an alternating current voltage. Resistances 33 and 34 are connected respectively between the ends of the secondary 32 and the grids 26 and 29 of the rectifier tubes 23 and 24. Condensers or capacitive means 35 and 36 are connected across the grid and cathode of the first and second rectifier tube respectively. These resistances and condensers form R-C combinations that shift the phase of the alternating voltage applied to the control grids with respect to the phase of the alternating voltage applied to the anode of the respective rectifier tubes. Additional resistances 37 and 38 are connected in series between the secondary 32 of the grid transformer 31 and the respective grids of the rectifier tube, and condensers 39 and 40 are also connected across the grid and cathode of the rectifier tubes 23 and 24, respectively. The variable impedance device 22 includes a first thermionic tube 41, a plate load resistance 42, and variable biasing means 43. The first thermionic tube 41 includes an anode 44, a control grid 45 and a cathode 46. The control grid 45 is connected to one end of the secondary 32. The cathode 46 is connected to the control grid 45 through the variable biasing means 43, which includes a cathode potentiometer 47 with a movable finger 48.

In operation, the alternating current source 16 supplies alternating current energy to the anode transformer 17 when the switch means 18 is closed. The secondary 19 of the anode transformer 17 supplies an alternating voltage between the anodes 25 and 28 of the first and second rectifier tubes 23 and 24 of the rectifier system 21. The grid transformer 31 supplies alternating current voltage to the grids 26 and 29 of the rectifier tubes in a phase relation determined by the R-C combinations 33—35 and 34—36. This will make the phase of the voltage applied to the grids aproximately 80 or 90 degrees lagging with respect to the phase of the anode voltage. The R-C combinations 37—39 and 38—40 are for the purpose of eliminating spurious high frequency disturbances to prevent these disturbances from affecting the operation of the rectifier system and need not be considered in this discussion of the operation of the control system. The control grids 26 and 29 of the rectifier tubes 23 and 24 will, once each cycle, go positive with respect to the cathodes 27 and 30, respectively. When the control grids are positive with respect to the cathodes, grid current will be drawn that will charge the condensers 35 and 36, with the upper plates negative and the lower plates positive, as shown. After a few cycles, enough grid current will have been drawn by the grids 26 and 29 to charge the condensers 35 and 36 sufficiently so that they will make the relative potential of the grids sufficiently negative with respect to the cathodes to prevent the grids from drawing further grid current. In this condition of charge on the condensers 35 and 36 which causes a negative bias on the grids, no rectified output current will be obtainable from the rectifier system 21, as the rectifier tubes 23 and 24 will be biased to cut-off. The variable impedance device 22 provides a controllable means for discharging the condensers 35 and 36 at a predeterminable variable rate. This discharging of the condensers 35 and 36 lowers the voltage across them, and lowers the effective negative bias on the grids 26 and 29, permitting them to pass current governed by the amount of effective bias on the rectifier tube. The variable impedance device 22 is predeterminable in its impedance setting by varying the cathode potentiometer 47 of the variable biasing means 43. By varying the bias on the thermionic tube 41 of the variable impedance device 22, a higher or lower impedance or effective resistance of this thermionic tube 41 will be obtained. It will therefore be seen that by varying the movable finger 48 on the cathode potentiometer 47, a variable amount of rectified power is deliverable to the field 15.

The armature energizing system 11 follows the same general theory of operation, but in addition incorporates other modifications and advantages. The armature energizing system 11 includes an alternating current source 51, a rectifier system 52, and an electrical control system 54. The rectifier system 52 is energized from the alternating current source 51 through switch means 53, and is a full-wave bridge rectifier system that includes first, second, third and fourth rectifier tubes 55, 56, 57 and 58, and is controlled by the electrical control system 54. The first rectifier tube 55 has an anode 59, a control grid 60, and a cathode 61, and the second rectifier tube 56 has like elements designated 62, 63 and 64. The third rectifier tube 57 has an anode 65 and a cathode 66, and the fourth rectifier tube 58 has an anode 67 and a cathode 68. The anodes 59 and 62 of the first and second rectifier tube 55 and 56 are connected across the alternating current source 51, and likewise the cathodes 66 and 68 of the third and fourth rectifier tubes 57 and 58 are so connected across the alternating current source 51. The cathodes 61 and 64 of the first and second rectifier tubes 55 and 56 are interconnected by connection means 69, and the anodes 65 and 67 of the third and fourth rectifier tubes 57 and 58 are interconnected by connection means 70, to complete the full-wave bridge rectifier circuit. The motor armature 14 is connected across the connection means 69 and 70 to obtain the rectified output of the rectifier system 52. A grid transformer 75 has its input winding or primary 76 connected across the alternating current source 51, and has a secondary or output winding 77 for energizing the grids 60 and 63 of the first and second rectifier tubes 55 and 56. Capacitances 71 and 72 are connected between the cathodes and grids of the first and second rectifier tubes 55 and 56 respectively. Resistances 73 and 74 are serially connected between the ends of the secondary 77 and the respective grids of the rectifier tubes 55 and 56. RF filter condensers 78 and 79 are also connected between the cathodes and grids of the rectifier tubes 55 and 56, and filter resistors 80 and 81 are serially connected between the grids 60 and 63 and the respective ends of the secondary 77. An impedance device 82 is connected between the secondary 77 and the interconnected cathodes 61 and 64. This impedance device 82 includes second and third thermionic tubes 83 and 84 and a plate load resistor 85. The second thermionic tube 83 has an anode 86, a control grid 87 and a cathode 88, and the third thermionic tube 84 has like elements designated as 89, 90 and 91. The anodes 86 and 89 are interconnected, and then such interconnected anodes are connected to the interconnected cathodes 61 and 64 of the first and second rectifier tubes 55 and 56 by the plate load resistor 85. The control grids 87 and 90 are connected respectively to the anodes 86 and 89, and the cathodes 88 and 91 are connected respectively to the ends of the secondary 77 of the grid transformer 75.

Variable voltage means 92 are connected between the secondary 77 of the grid transformer 75 and the connection means 70, which is the negative side of the load or motor armature 14. The variable voltage means 92 includes a fourth thermionic tube 93 and variable biasing means 94. The fourth thermionic tube 93 is an impedance device shown as a twin triode tube having anodes 95 and 96, grids 97 and 98, and a cathode 99. The anodes 95 and 96 are connected across the ends of the secondary 77 of the grid transformer 75, and the cathode 99 is connected through a cathode potentiometer 100 to the connection means 70, which is the negative side of the load or motor armature 14. The cathode potentiometer 100 is part of the variable biasing means 94. The grids 97 and 98 are connected together and then connected through a by-pass condenser 101 to the cathode 99. The variable biasing means 94 includes a resistance 102, a resistance 103, a variable resistance 104 and a variable resistor 107 connected in series between the connection means 69 and 70, or the positive and negative sides of the motor armature 14. The interconnected control grids 97 and 98 are connected to the juncture of the resistances 102 and 103 to establish the bias potential applied to the control grids 97 and 98. The variable biasing means 94 also includes an IR compensation means 105, and a compounding compensation means 106. The IR compensation means 105 includes a rectifier tube 108, current transformers 109 and 110, filter means 111, and the variable resistor 107. The rectifier device 108 has been shown as a full wave rectifier tube having anodes 112 and 113 and a cathode 114. The first and second current transformers 109 and 110 have input windings or primaries 115 and 116, respectively, that are connected in series between the alternating current source 51 and the rectifier system 52. The current transformers 109 and 110 have secondaries or output windings 117 and 118, respectively, that are connected in series across the anodes 112 and 113 of the rectifier device 108. The cathode 114 of the rectifier device 108 is the positive of, and the juncture of the secondaries 117 and 118 is the negative of, the output of the rectifier device 108. This output is connected across the variable resistor 107, with the filter means 111 connected thereacross for filtering. The compounding compensation means 106 includes a fifth thermionic tube 119 and the variable resistor 104. The fifth thermionic tube 119 has an anode 120 and a cathode 122. The cathode 122 is connected to the juncture of the variable resistor 104 and 107, and the anode 20 is connected to the juncture of the resistor 103 and the variable resistor 104.

The operation of the armature energizing system 11 is basically the same as the operation of the field energizing system 12. The rectifier system 52, being a full-wave rectifier bridge supplies full-wave rectifier current to the armature 14 which is connected across the connection means 69 and 70. The R-C combination 71—73 and 72—74 shift the phase of the alternating current voltage applied to the grids 60 and 63 so that such voltage is approximately 80 to 90 degrees lagging the phase of the voltage applied to the anodes 59 and 62 of the first and second rectifier tubes 55 and 56. As previously explained in the operation of the field energizing system 12, the condensers 71 and 72 will be charged by the grid current drawn while the grids are positive with respect to the cathode. This will make the upper plate of the condensers positive with respect to the lower plate, as shown in the figure. This charge on the condensers will be discharged through the impedance device 82. The impedance device 82 has not been made variable, but has been fixed at an effective impedance governed by the value of the plate load resistor 85. The plate load resistor 85 has been so chosen to permit the second and third thermionic tubes 83 and 84 to pass enough current to keep the condensers 71 and 72 substantially discharged. This operates to cause the rectifier tubes 55 and 56 to have practically no direct current bias on the grids, therefore, the only bias is the alternating current bias from the secondary 77 of the grid transformer 75. The rectifier tubes 55 and 56 have been chosen for their property of having a critical grid voltage that is negative with respect to zero voltage reference. The magnitude of the alternating current voltage from the grid transformer 75 is therefore sufficient to fire the rectifier tubes 55 and 56 substantially at the beginning of the positive half cycle for that tube, and therefore practically full output is obtained from the rectifier system 52. It will be seen that the bridge rectifier circuit of my full-wave rectifier system 52 has the first and second tubes 55 and 56 as being controllable, with the third and fourth rectifier tubes 57 and 58 as uncontrollable. This effects a saving in the cost of the tubes and the cost of the control circuits by such simplification.

The variable output of the armature energizing system 11 is provided by the variable voltage means 92. The variable voltage means 92 operates such as to charge the condensers 71 and 72 in a variable predetermined manner which charging is in opposition to the discharging of the condensers 71 and 72 by the impedance device 82. The cathode potentiometer 100 is used to vary the effective bias on the thermionic tube 93 of the variable voltage means 92. By varying the effective bias of the fourth thermionic tube 93, its impedance or effective resistance can be varied. Since the variable voltage means 92 is connected effectively in series with the impedance device 82 across the output of the rectifier system 52, the variable voltage means 92 obtains a direct current voltage from this output of the rectifier system 52. By varying the effective impedance of the fourth thermionic tube 93, a variable amount of electron current is passed by this fourth thermionic tube 93 to charge the condensers 71 and 72. The cathode potentiometer 100 has a sufficient range of variation to permit cut-off of the fourth thermionic tube 93, or a maximum output. The operation of the variable voltage means 92 and the impedance device 82 is such that the variable voltage means 92 opposes the action of the impedance device 82. The impedance device 82 ordinarily passes sufficient current to discharge the condensers 71 and 72 to a point that allows the rectifier system 52 to deliver a full output. The variable voltage means 92 with a high bias has a high effective impedance and passes no current to charge the condensers 71 and 72, therefore the rectifier system 52 still has a full output. With a low bias condition of the thermionic tube 93 of the variable voltage means 92, current is passed by the variable voltage means 92 to charge the condensers 71 and 72 to such a point that the rectifier system 52 is biased to cut-off. It will therefore be seen that the cathode potentiometer 100 is a speed control, as it governs the ultimate speed of the motor armature 14 by varying the amount of voltage applied to the motor armature 14. The armature energizing system 11 is completely operable as described, but the voltage regulation under variations of load is improved by the operation of the IR compensation means 105.

The IR compensation means 105 obtains a voltage from the secondaries 117 and 118 of the current transformers 109 and 110. The voltage thus applied across the anodes 112 and 113 of the rectifier device 108 causes a rectified direct current voltage to flow in the variable resistor 107 such that the upper end of this variable resistor 107 is positive with respect to the lower end, as shown in the drawing. With an increase in load, the alternating current source 51 must supply more current to the rectifier system 52 to supply this increased load. An increase in such current from the alternating current source 51 is transformed by the current transformers 109 and 110 into a greater voltage across the secondaries 117 and 118 of these current transformers 109 and 110. This increased voltage across the secondaries 117 and 118 causes a greater direct current voltage to be impressed across the variable resistor 107 by the rectifier device 108. This greater direct current voltage across the variable resistor 107 is in such a manner as to increase the effective negative bias applied to the grids 97 and 98 of the fourth thermionic tube 93 to cause it to pass less current for the charging of the condensers 71 and 72. Consequently, the first and second rectifier tubes 55 and 56 do not have as great an effective bias and therefore have a correspondingly greater output. When the load on the motor 13 is decreased, less current is required from the alternating current source 51 for the power requirements of the rectifier system 52, with a consequently lower voltage applied to the rectifier device 108, a lower effective bias on the fourth thermionic tube 93, a greater effective bias on the rectifier tubes 55 and 56, and therefore a lower rectified output from the rectifier system 52. The variable resistor 107 is therefore capable of adjusting the amount of IR compensation applied to the electrical control system 54, and tends to eliminate the drooping characteristic of the speed-load curve of the motor 13.

As a further aid in obtaining a flat speed-load curve, the compounding compensation means 106 may be employed. Under heavy load conditions, the voltage across the variable resistor 107 will rise through the action of the IR compensation means 105 as previously described. This rise in voltage across the variable resistor 107 causes a corresponding increase in voltage across the serially connected resistors 102, 103 and 104, because the voltage across these serially connected resistors is in opposition to the polarity of the voltage across the variable resistor 107. This means that a greater voltage drop is obtained across the resistances 103 and 104, which to some extend opposes the increased negative bias applied to the grids 97 and 98 by the rise in voltage across the variable resistor 107. To counteract this rise in voltage across the variable resistor 104, the fifth thermionic tube 119 is connected as a shunt across this variable resistor 104, to cause its impedance to be in parallel with the impedance of the variable resistor 104. As the voltage across the variable resistor 104 rises, more voltage is applied to the fifth thermionic tube 119 which thereby passes more current and lowers its effective impedance. This tends to produce a lower impedance of the parallel combination of the fifth thermionic tube 119 and the variable resistor 104, to cause the voltage drop across this parallel combination to remain substantially constant. The resultant action is to cause the overall voltage drop across the resistances 103 and 104, which affect the effective bias of the fourth thermionic tube 93, to remain fairly constant, therefore under increased loads a greater negative bias from the variable resistor 107 is applied to this fourth thermionic tube 93, with a still lesser bias applied to the rectifier tubes 55 and 56, and a still greater output from the rectifier system 52 to the load 13.

The action of the entire electrical control system 54 is such that very good voltage and speed regulation is obtained from the motor 13. The electrical system provides a wide speed range from rated speed to $\frac{1}{30}$ or less of rated speed. The regulation afforded by the compensation means produces a speed variation of less than 5 per cent at any predeterminable speed setting from no load to full load. The entire circuit achieves this result with small inexpensive parts such as radio receiving tubes and low voltage capacitors, and by the elimination of transformers, with the end result of greatly reduced equipment size and a fraction of the manufacturing cost. As was stated at the beginning of the specification, many circuit features are interchangeable between the armature energizing system 11 and the field energizing system 12. In the armature energizing system 11, it will be noted that four rectifier tubes are employed in the full-wave bridge rectifier circuit 52 which circuit is connected directly to the alternating current source 51 without any intervening anode transformer. In the field energizing system 12, only two rectifier tubes are employed in a full-wave rectifier circuit 21, which are connected across the secondary of an anode transformer energized from the alternating current source 16. The mid-tap 20 of the secondary 19 is a symmetrical point with respect to the alternating current source 16 in the field energizing system 12. One side of the load is connected to this symmetrical point to complete the rectifier circuit. In the armature energizing system 11 a symmetrical point with respect to the alternating current source 51 is established by the connection means 70, which is the connection means between the anodes of the third and fourth rectifier tubes. This symmetrical point serves the same purpose as the mid-tap 20 of the secondary of the anode transformer, inasmuch as it performs the function of providing a return path for the rectified current. A full-wave four tube bridge circuit without an anode transformer may easily be employed in the field energizing system 12, and conversely a two-tube full-wave rectifier system energized from a mid-tapped anode transformer may be employed in the armature energizing system 11. A noteworthy feature of the armature energizing system 11 as described with the bridge type of rectifier circuit is that the anode transformer is eliminated, therefore saving considerable bulk, weight and cost.

In the field energizing system 12, the variable impedance device 22 could be made fixed, and the variable output of the field energizing system 12 could be provided by variable voltage means similar in operation to the variable voltage means 92 of the armature energizing system 11. This might be desirable if better regulation of the load is required, and especially if the load is subject to great variation.

It is feasible to construct an armature energizing system 11 on similar lines to the field energizing system 12, that is, having the impedance device 82 as variable rather than fixed, and eliminating the variable voltage means 92. Electrical systems based on this principle of operation have been so constructed, but have proved unsatisfactory for wide variations of load, especially at very light or no load operating conditions. It has been found that at a very light load or no load condition, the armature will operate at a voltage range substantially at the peak value of the rectified full-wave voltages, rather than at the R. M. S. value of the rectified voltage. This causes the motor to run very fast at no load conditions, considerably above the rated speed of the motor. A theory for such phenomenon is that there is a capacitive effect between the windings in the motor armature 14 that cause a filtering action to smooth out the voltage peaks substantially at the maximum value of the voltage half-waves. By constructing the armature energizing system 11 in accordance with the system as disclosed in this specification, that is, with a fixed impedance means for discharging the condensers and a variable voltage means obtaining a voltage from the armature for charging the condensers, this light load high speed operating characteristic has been eliminated. The reason for good speed regulation with light load using the armature energizing system as described, is because as the armature voltage tends to rise on light loads as previously explained, the variable voltage means 92 directly counteracts this rise by utilizing this rising voltage to lower the output of the rectifier system 52.

It will be obvious that two such energizing systems need not be provided for any given load. If the particular load requires only one source of direct current voltage, such a rectifier system could be constructed according to the principles of operation of either of the two energizing systems hereinbefore disclosed, or a combination of both.

Although I have described my invention in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In combination with a controllable rectifier for supplying rectified power to a load from an alternating current source, said controllable rectifier having at least an electron emitting element and an electron control element, the provision of a capacitive element connected to said electron control element whereby the said electron control element will draw electrons to charge the said capacitive element when the said electron control element is positive with respect to said electron emitting element, means for applying an alternating current voltage to said electron control element from said alternating current source, fixed means for displacing the phase of the alternating current voltage applied to the electron control element with respect to the phase of the voltage applied to the electron emitting element, impedance means connected to said capacitive element for discharging the electron charge on said capacitive element, said impedance means including a thermionic tube, and variable unidirectional voltage means connected to said capacitive element for charging the said capacitive element, said variable unidirectional voltage means including a thermionic tube and variable biasing means connected across said load for obtaining a unidirectional current therefrom.

2. An electrical system comprising in combination, an alternating current source, a direct current motor having a field and an armature, an armature energizing system, and a field energizing system, said energizing systems each being operable from said alternating current source and having a first and a second full wave rectifier circuit, respectively, said rectifier circuits each having first and second rectifier devices, said rectifier devices each having an anode, a cathode and a grid, means for connecting said cathodes together, means for connecting said anodes to said alternating current source, means for connecting the load of the respective energizing systems between the interconnected cathodes and a symmetrical point of the energizing system with reference to said source to effect a closed circuit for the rectified current of the respective rectifier circuits, a first transformer energized from said alternating current source and having an output winding with first and second terminals, first and second impedance means, means for connecting said first and second impedance means between the first and second output winding terminals and the grid of said first and second rectifier devices, respectively, first and second capacitive means, means for connecting said first and second capacitive means between the cathode and the grid of said first and second rectifier devices, respectively, to charge the said capacitive means by grid current flow, said field energizing system including third impedance means effectively in parallel with said first and second capacitive means to discharge the said capacitive means at a predeterminable variable rate, said armature energizing system including fourth impedance means effectively in parallel with said first and second capacitive means to discharge the said capacitive means at a fixed rate, said armature energizing system also including variable unidirectional voltage means to charge the said capacitive means at a predeterminable variable rate.

3. An electrical system comprising, in combination, an alternating current source, a controllable rectifier connected to said alternating current source, and a load operable from said controllable rectifier, said controllable rectifier including a full wave rectifier circuit having first, second, third and fourth rectifier devices, said first and second rectifier devices each having an anode, a cathode and a grid, means for connecting said cathodes together, means for connecting said anodes to said alternating current source, said third and fourth rectifier devices each having an anode and a cathode, means for connecting said anodes of said third and fourth rectifier devices together, means for connecting said cathodes of said third and fourth rectifier devices to said alternating current source, means for connecting said load between said interconnected cathodes of said first and second rectifier device and said interconnected anodes of said third and fourth rectifier devices, a first transformer energized from said alternating current source and having a secondary with first and second terminals, first and second impedance means and first and second capacitive means for providing a fixed phase shift to said first and second rectifier devices, means for connecting said first and second impedance means between the first and second secondary terminals and the grids of said first and second rectifier devices, respectively, means for connecting said first and second capacitive means between the cathode and grid of said first and second rectifier devices, respectively, to charge the said capacitive means by grid current flow, and third impedance means effectively in parallel with said first and second capacitive means to discharge the said capacitive means at a predetermined variable rate.

4. An electrical system comprising, in combination, an alternating current source, a controllable rectifier connected to said alternating current source, and a load operable from said controllable rectifier, said controllable rectifier including a full wave rectifier circuit having first and second rectifier devices, said rectifier devices each having an anode, a cathode and a grid, means for connecting said cathodes together, means for connecting said anodes to said alternating current source, means for connecting said load between said interconnected cathodes and a symmetrical point of said system with reference to said source to effect a closed circuit for the rectified current of said controllable rectifier, a first transformer energized from said alternating current source and having a secondary with first and second terminals, first and second impedance means, means for connecting said first and second impedance means between the first and second secondary terminals and the grids of said first and second rectifier devices, respectively, first and second capacitive means, means for connecting said first and second capacitive means between the cathode and grid of said first and second rectifier devices, respectively, to charge the said capacitive means by grid current flow, and third impedance means effectively in parallel with said first and second capacitive means to discharge the said capacitive means at a predetermined variable rate, said third impedance means including a plate load resistor, a thermionic tube having a plate and cathode, and variable biasing means for the said thermionic tube, said cathode of said thermionic tube being connected to a terminal of said secondary through the said variable biasing means, and said plate load resistor being connected between said plate and said interconnected cathodes.

5. An electrical system comprising, in combination, an alternating current source, a controllable rectifier connected to said alternating current source, and a load operable from said controllable rectifier, said controllable rectifier including a full wave rectifier circuit having first and second rectifier devices, said rectifier devices each having an anode, a cathode and a grid, means for connecting said cathodes together, means for connecting said anodes to said alternating current source, means for connecting said load between said interconnected cathodes and a symmetrical point of said system with reference to said source to effect a closed circuit for the rectified current of said controllable rectifier, a first transformer energized from said alternating current source and having a secondary with first and second terminals, first and second impedance means, means for connecting said first and second impedance means between the first and second secondary terminals and the grids of said first and second rectifier devices, respectively, first and second rectifier devices, respectively, first and second capacitive means, means for connecting said first and second capacitive means between the cathode and grid of said first and second rectifier devices, respectively, to charge the said capacitive means by grid current flow, third impedance means effectively in parallel with said first and second capacitive means to discharge the said capacitive means at a fixed rate, said third impedance means including a plate load resistor and a first thermionic tube having a plate and cathode, said cathode of said first thermionic tube being connected to a terminal of said secondary, and said plate load resistor being connected between said plate and said interconnected cathodes, and variable unidirectional voltage means connected effectively in parallel with the series combination of said capacitive means and said load to charge the said capacitive means, said variable unidirectional voltage means including a second thermionic tube having a second plate, cathode and a control grid, a cathode biasing potentiometer connecting cathode of said second thermionic tube to said symmetrical point of said system, means for connecting said second plate to a terminal of said secondary, and grid potential determining means for said control grid including a first resistor connecting said control grid of said second thermionic tube to said interconnected cathodes of said rectifier devices, and a second resistor connecting said control grid to said symmetrical point of said system.

6. An electrical system comprising, in combination, an alternating current source, a controllable rectifier connected to said alternating current source, and a load operable from said controllable rectifier, said controllable rectifier including a full wave rectifier circuit having first and second rectifier devices, said rectifier devices each having an anode, a cathode and a grid, means for connecting said cathodes together, means for connecting said anodes to said alternating current source, means for connecting said load between said interconnected cathodes and a symmetrical point of said system with reference to said source to effect a closed circuit for the rectified current of said controllable rectifier, a first transformer energized from said alternating current source and having a secondary with first and second terminals, first and second impedance means, means for connecting said first and second impedance means between the first and second secondary terminals and the grids of said first and second rectifier devices, respectively, first and second capacitive means, means for connecting said first and second capacitive means between the cathode and grid of said first and second rectifier devices, respectively, to charge the said capacitive means by grid current flow, third impedance means effectively in parallel with said first and second capacitive means to discharge the said capacitive means at a fixed rate, said third impedance means including a plate load resistor and a first thermionic tube having a plate and cathode, said cathode of said first thermionic tube being connected to a terminal of said secondary, and said plate load resistor being connected between said plate and said interconnected cathodes, variable unidirectional voltage means connected effectively in parallel with the series combination of said capacitive means and said load to charge the said capacitive means, said variable unidirectional voltage means including a second thermionic tube having a second plate, a cathode and a control grid, a cathode biasing potentiometer connecting said cathode of said second thermionic tube to said symmetrical point of said system, means for connecting said second plate to a terminal of said secondary, and grid potential determining means for said control grid including a first resistor connecting said control grid of said second thermionic tube to said interconnected cathodes of said rectifier devices, and a second resistor and a compensation potentiometer in series to connect said control grid to said symmetrical point of said system, and load-variation compensation means having an output for controlling said rectifier devices in accordance with the variations in the power requirements of said load, said load-variation compensation means including a current transformer having a primary and a secondary, a third thermionic tube having a plate and a cathode, said primary of said current transformer being connected effectively in series between the alternating current source and the said controllable rectifier, said secondary of said current transformer being connected to the said plate of the said third thermionic tube, said output of said load-variation compensation means being between the cathode of said third thermionic tube and a terminal of the secondary of said current transformer, and means for connecting the said output of said load-variation compensation means to the said compensation potentiometer of said variable unidirectional voltage means.

7. An electrical system comprising, an alternating current source, a direct current motor having a field and an armature, an armature energizing system, and a field energizing system, said armature and field energizing system each being operable from said alternating current source and having a first and a second rectifier device, respectively, said rectifier devices each having an anode, a cathode and a grid, means for connecting said anodes to said alternating current source, means for connecting the load of the respective energizing systems between the rectifier cathodes and said source to effect a closed circuit for the rectifier current of the respective rectifier devices, a first and a second transformer energized from said alternating current source and each having an output winding, first and second impedance means, means for connecting said first and second impedance means between the output winding of the first and second transformers and the grids of said first and second rectifier devices, respectively, first and second capacitive means, means for connecting said first and second capacitive means between the cathode and the grid of said first and second rectifier devices, respectively, to charge the said capacitive means by grid current flow, said field energizing system including third impedance means effectively in parallel with said second capacitive means to discharge the said second capacitive means at a predetermined variable rate, said armature energizing system including fourth impedance means effectively in parallel with said first capacitive means to discharge the said first capacitive means at a fixed rate, said armature energizing system also including variable unidirectional voltage means to charge the said first capacitive means at a predeterminable variable rate.

8. An electrical translating system comprising, in combination, an alternating current circuit, a direct current circuit, and a controllable space discharge device adapted to translate energy between said circuits, said controllable space discharge device including a full wave rectifier circuit having first and second rectifier devices, said rectifier devices each having an anode, a cathode and a grid, means for connecting said cathodes together, means for connecting said anodes to said alternating current circuit, means for connecting said direct current circuit between said interconnected cathodes and a symmetrical point of said system with reference to said alternating current circuit to effect a closed circuit for the rectified current of said controllable space discharge device, a first transformer energized from said alternating current circuit and having a secondary with first and second terminals, first and second impedance means, means for connecting said first and second impedance means between the first and second secondary terminals and the grids of said first and second rectifier devices, respectively, first and second capacitive means, means for connecting said first and second capacitive means between the cathode and grid of said first and second rectifier devices, respectively, to charge the said capacitive means by grid current flow, and third impedance means effectively in parallel with said first and second capacitive means to discharge the said capacitive means at a predetermined variable rate, said third impedance means including a plate load resistor, a thermionic tube having a plate and cathode, and variable biasing means for the said thermionic tube, said cathode of said thermionic tube being connected to a terminal of said secondary, and said plate load resistor being connected between said plate and said interconnected cathodes.

9. In combination with a controllable rectifier for supplying rectified power to a load from an alternating current source, said controllable rectifier having an anode and having at least an electron emitting element and an electron control element, the provision of a connection to said alternating current source and a capacitive element and resistive element connected in circuit between said control and emitting elements to provide a fixed phase shift to said controllable rectifier which phase shift is essentially all of that applied to the control element relative to said anode, the circuit connecting said capacitive element to said electron control element establishing said electron control element to draw electrons to charge the said capacitive element in a given sense when the said electron control element is positive with respect to said electron emitting element, means for applying an alternating current voltage of fixed phase relative to said source to said electron control element from said alternating current source, impedance means connected to said capacitive element for discharging the electron charge on said capacitive element, and variable unidirectional means to charge said capacitive element in said given sense.

10. An electrical system consisting of an alternating current source, a direct current load, controllable rectifier means for supplying rectified power to said load from said alternating current source, said controllable rectifier means having at least electron emitting means and electron control means, a capacitive element connected in circuit between said electron control means and said emitting means whereby the said electron control means will draw electrons to charge the said capacitive element when the said electron control means is positive with respect to said electron emitting means to thus bias said electron control means negatively, means for applying an alternating current voltage to said electron control means from said alternating current source, substantially unidirectional impedance means connected to said capacitive element for discharging the electron charge on said capacitive element to bias said electron control means less negatively, and variable unidirectional voltage means connected to said capacitive element for charging the said capacitive element to bias said electron control means more negatively.

11. An electrical system comprising, in combination, an alternating current source, a controllable rectifier connected to said alternating current source, a load operable from said controllable rectifier, said controllable rectifier having a plate, a cathode and a control element, a condenser connected between said cathode and said control element, a grid transformer energized from said alternating current source, a resistance serially connected to said condenser to provide a fixed phase shift to said control element relative to said plate, said grid transformer having an output winding connected across said serially connected resistance and condenser, and a substantially unidirectional impedance across said condenser to discharge the said condenser, said impedance including a thermionic tube and means connected therewith to vary the current through said thermionic tube.

12. An electrical system comprising, in combination, an alternating current source, a controllable rectifier connected to said alternating current source, a load operable from said controllable rectifier, said controllable rectifier having a plate, a cathode and a control element, a condenser connected between said cathode and said control element, a grid transformer energized from said alternating current source, a resistance serially connected to said condenser to provide a fixed phase shift to said control element relative to said plate, said grid transformer having an output winding connected across said serially connected resistance and condenser, an impedance across said condenser to discharge the said condenser to make said control element less negative relative to said cathode, said impedance including a thermionic tube for said thermionic tube, and variable voltage means connected to said condenser for charging the said condenser to make said control element more negative relative to said cathode.

13. An electrical translating system comprising, in combination, an alternating current circuit, a direct current circuit, and a controllable space discharge device adapted to translate energy between said circuits, said controllable space discharge device including a full wave rectifier circuit having first and second rectifier devices, said rectifier devices each having an anode, a cathode and a grid, means for connecting said cathodes together, means for connecting said anodes to said alternating current circuit, means for connecting said direct current circuit between said interconnected cathodes and a symmetrical point of said system with reference to said alternating current circuit to effect a closed circuit for the rectified current of said controllable space discharge device, a circuit element having first and second terminals and adapted to be energized from said alternating current circuit, first and second impedance means, means for connecting said first and second impedance means between the first and second circuit element terminals and the grids of said first and second rectifier devices, respectively, first and second capacitive means, means for connecting said first and second capacitive means between the cathode and grid of said first and second rectifier devices, respectively, in a manner to permit charging the said capacitive means by grid current flow, and third impedance means effectively in parallel with said first and second capacitive means, said third impedance means including a thermionic tube, and variable means for varying the current passed by the said thermionic tube.

14. A control circuit for a controllable translation system translating energy between alternating current and direct current circuits, including, a controllable space discharge device having a cathode and a control element, a capacitance, first circuit means for connecting said capacitance between said cathode and said control element, second circuit means including a first substantially unidirectional current conducting device to permit passage of current in a given direction through said capacitance to charge same in a sense to bias said control element in a negative direction relative to said cathode, and third circuit means including a second substantially unidirectional current conducting device to permit passage of current in the direction opposite to said given direction through said capacitance to charge same in a sense to bias said control element in a positive direction relative to said cathode, one of said circuit means being variable.

15. A control circuit for a controllable translation system translating energy between alternating current and direct current circuits, including, a controllable space discharge device having a cathode and a control element, a capacitance, first circuit means for connecting said capacitance between said cathode and said control element, second circuit means including a first substantially unidirectional current conducting device to permit passage of current in a given direction through said capacitance to charge same in a sense to make said control element more negative or less positive relative to said cathode, and third circuit means including a second substantially unidirectional current conducting device to permit passage of current in the direction opposite to said given direction through said capacitance to charge same in a sense to make said control element less negative or more positive relative to said cathode, one of said second and third circuit means being variable.

16. A control circuit for a controllable translation system translating energy between alternating current and direct current circuits, including, a controllable space discharge device having electron emitting and control elements, a capacitive reactance, first circuit means for connecting said capacitive reactance between said electron emitting and control elements in a manner to permit charging said capacitive reactance in a given direction by grid rectification, second circuit means including a first substantially unidirectional current conducting device for discharging any charge on said capacitive reactance which charge is in said given direction, and third circuit means including a second substantially unidirectional current conducting device passing current through said capacitive reactance in the same direction as that produced by grid rectification, one of said second and third circuit means including variable means for varying the state of charge on said capacitive reactance.

CLAUDE E. GREENE.

REFERENCES CITED

The following references are of record in the file of this patent:

UNITED STATES PATENTS

| Number | Name | Date |
|---|---|---|
| 1,654,937 | Knight | Jan. 3, 1928 |
| 1,655,036 | Alexanderson et al. | Jan. 3, 1928 |
| 1,893,772 | Garman | Jan. 10, 1933 |
| 1,985,003 | Von Engle et al. | Dec. 18, 1934 |
| 2,117,908 | Okawa et al. | May 17, 1938 |
| 2,119,130 | Ehrensperser | May 31, 1938 |
| 2,156,959 | Bedford | May 2, 1939 |
| 2,164,792 | Winograd | July 4, 1939 |
| 2,278,212 | Moyer | Mar. 31, 1942 |
| 2,288,339 | Willis | June 30, 1942 |
| 2,312,117 | Moyer et al. | Feb. 23, 1943 |